Figure 1:
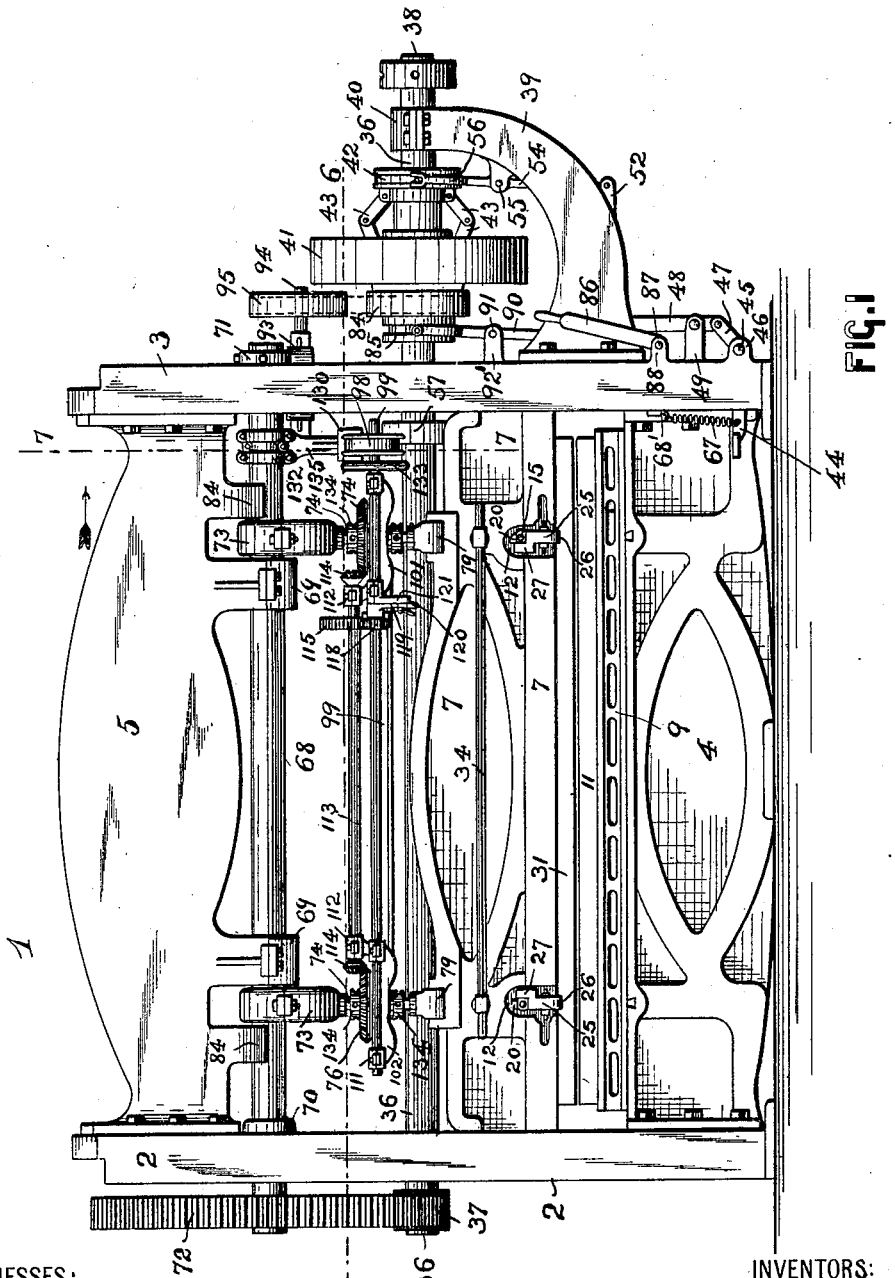

No. 679,031. Patented July 23, 1901.
G. A. OHL, SR., G. A. OHL, JR., F. W. THEBERATH & A. A. BERGHOF.
POWER PRESS
(Application filed Mar. 5, 1901.)
(No Model.) 4 Sheets—Sheet 1.

WITNESSES: INVENTORS:
Geo. L. Richards George A. Ohl Sr., George A. Ohl Jr.
W. B. Fraentzel Frederick W. Theberath, and
BY August A. Berghof
Fred L. Fraentzel
ATTORNEY

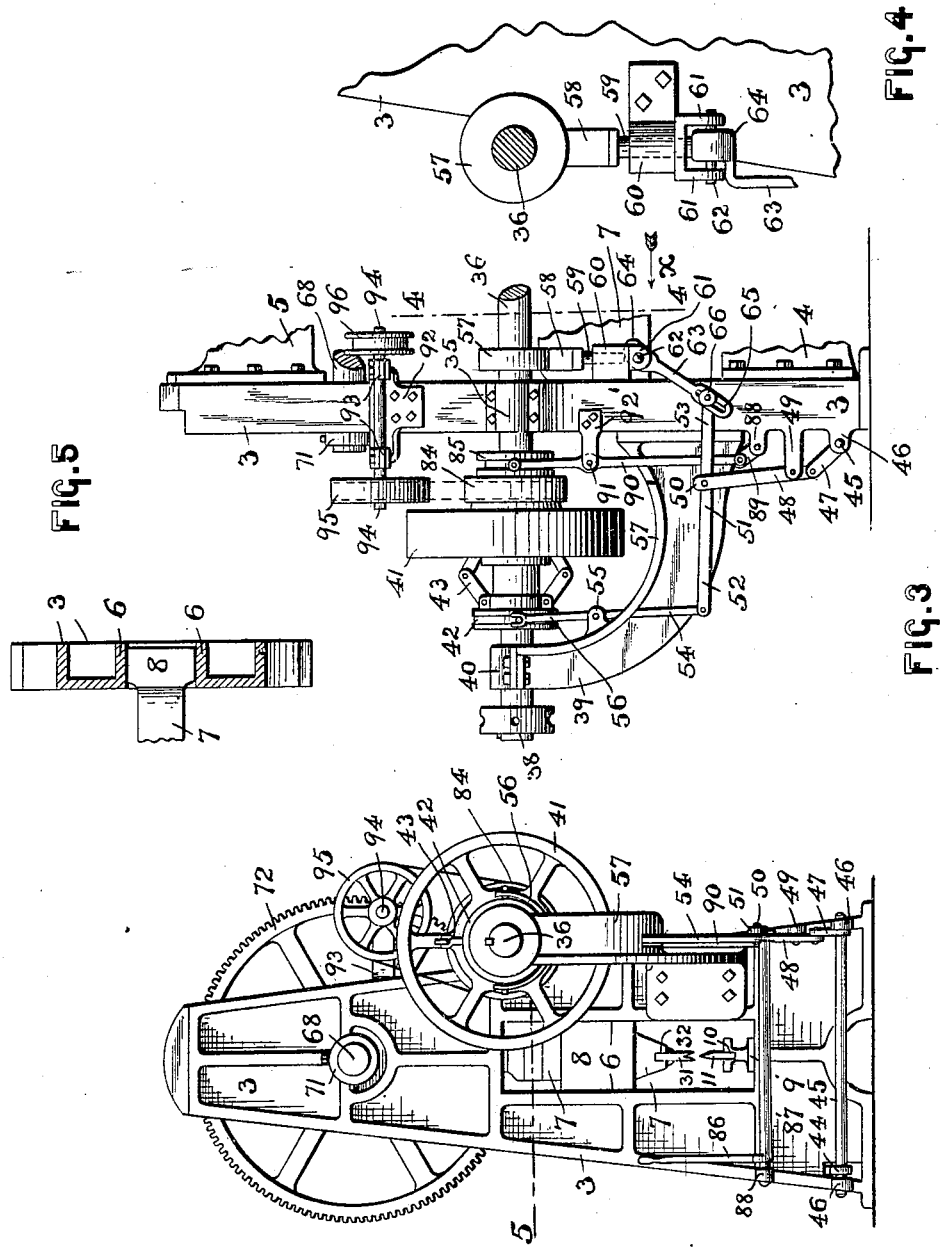

No. 679,031. Patented July 23, 1901.
G. A. OHL, Sr., G. A. OHL, Jr., F. W. THEBERATH & A. A. BERGHOF.
POWER PRESS.
(Application filed Mar. 5, 1901.)
(No Model.) 4 Sheets—Sheet 3.
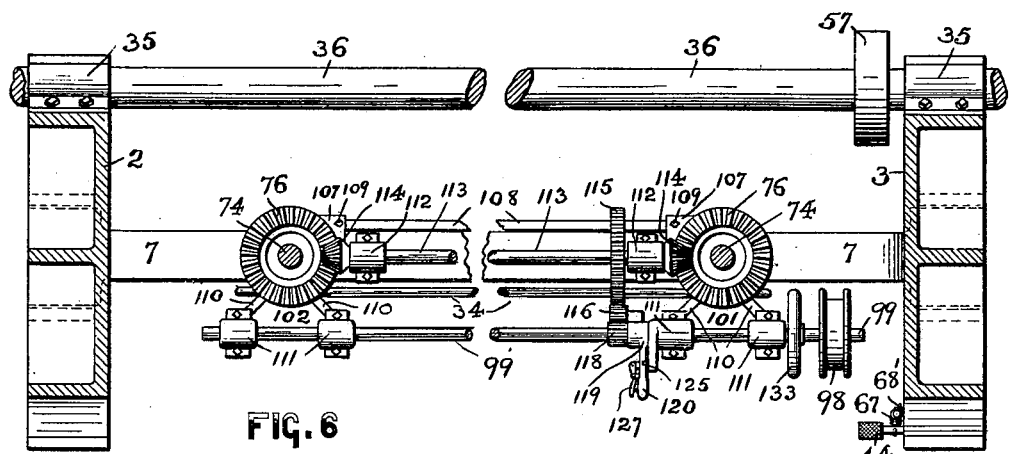
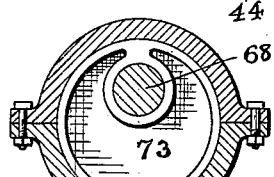
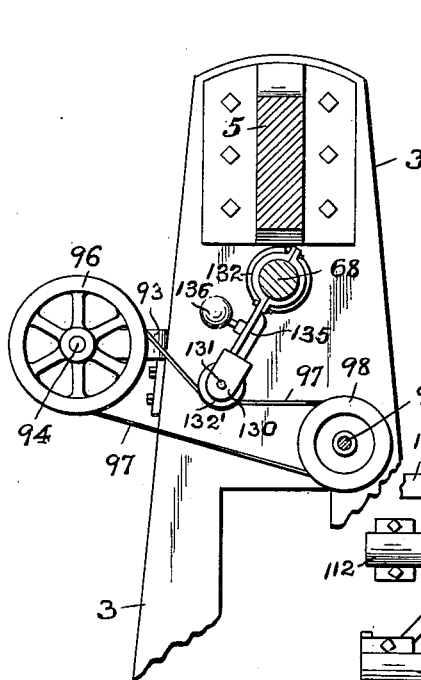
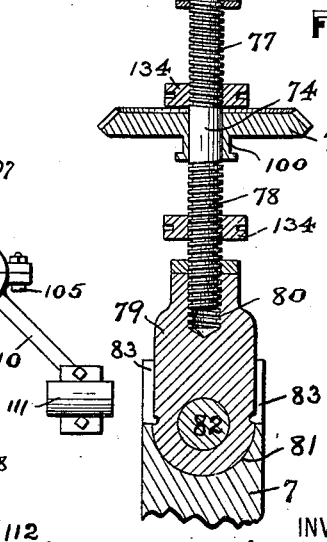
WITNESSES:
INVENTORS:
ATTORNEY

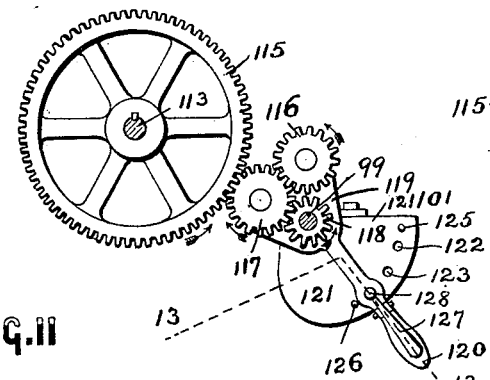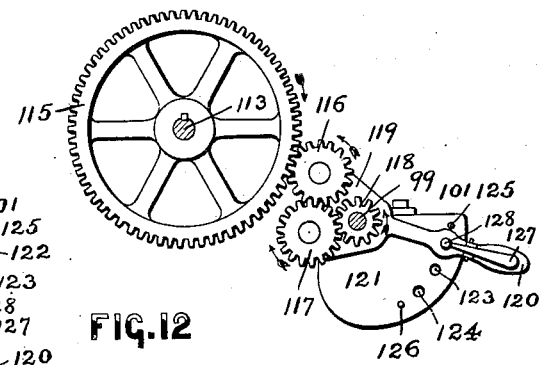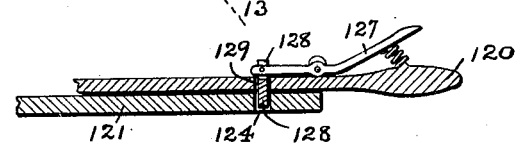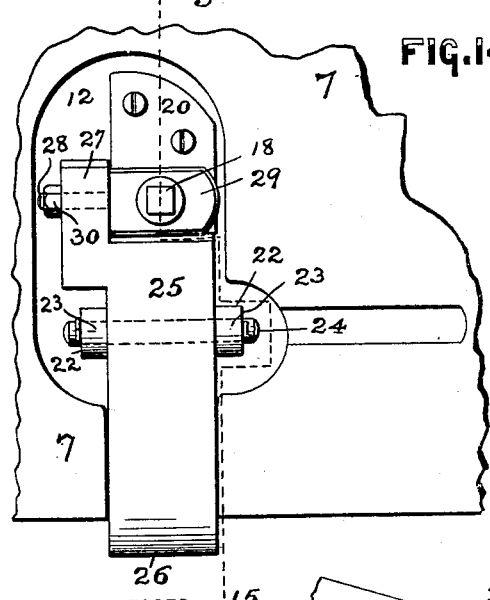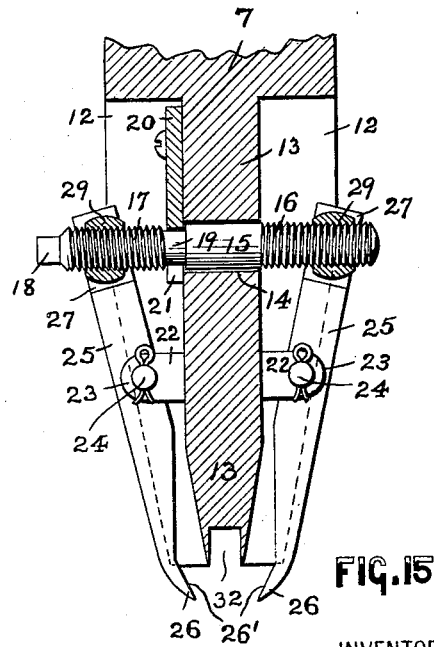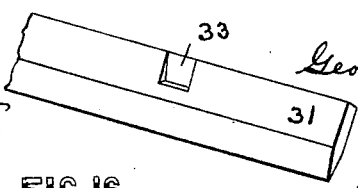

UNITED STATES PATENT OFFICE.

GEORGE A. OHL, SR., GEORGE A. OHL, JR., FREDERICK W. THEBERATH, AND AUGUST A. BERGHOF, OF NEWARK, NEW JERSEY, ASSIGNORS TO GEORGE A. OHL & CO., OF NEW JERSEY.

POWER-PRESS.

SPECIFICATION forming part of Letters Patent No. 679,031, dated July 23, 1901.

Application filed March 5, 1901. Serial No. 49,927. (No model.)

*To all whom it may concern:*

Be it known that we, GEORGE A. OHL, Sr., GEORGE A. OHL, Jr., FREDERICK W. THEBERATH, and AUGUST A. BERGHOF, citizens of the United States, residing at Newark, in the county of Essex and State of New Jersey, have invented certain new and useful Improvements in Power-Presses; and we do hereby declare the following to be a full, clear, and exact description of the invention, such as will enable others skilled in the art to which it appertains to make and use the same, reference being had to the accompanying drawings, and to the numerals of reference marked thereon, which form a part of this specification.

This invention has reference generally to improvements in that class of power-presses which are employed for the purpose of bending metal or for the purpose of corrugating, crimping, or squeezing together sheet metal or for the working of other materials.

The present invention, therefore, has for its principal object to provide a power-press of a novel design which is especially adapted for bending metal, embodying in the construction of the machine features which will admit of a very wide range of work to be performed on the machine, the press being especially constructed for the purposes of making metal cornices.

A further object of this invention is to provide a large and powerful press which shall be very simple in its construction and operation, the operating mechanism thereof being controlled by a foot-treadle and link-motion working a friction-clutch for rotating the main or pinion shaft of the machine and having a brake upon the pinion-shaft which effectually places the slide or hammer of the press under perfect control of the operator at all times, whereby the slide or hammer can be stopped at any part of its stroke.

A further object of this invention is to provide an improved and quick adjustment of the slide or hammer by means of a "frog-motion," which is actuated from a hand-lever and a pulley arranged upon the shaft or spindle bearing the frog-motion, whereby two or more pitmen and eccentrics, which produce a reciprocatory motion of the slide or hammer, can be simultaneously adjusted and the movable parts of the machine still maintained in their perfect alinement.

Our invention therefore consists in the general construction of power-press to be hereinafter fully set forth; and, furthermore, the invention consists in the several novel arrangements and combinations of the various mechanism and the details of the construction thereof, all of which will be described in the following specification and then finally embodied in the clauses of the claim, which form a part of this specification.

The invention is clearly illustrated in the accompanying sheets of drawings, in which—

Figure 1 is a front elevation of a powerpress embodying the principles of this invention. Fig. 2 is an end view of the press; and Fig. 3 is a rear view of one end of the press, said view representing in elevation one arrangement of friction-clutch upon the pinion-shaft and the link-motion for operating said clutch and also a brake mechanism. Fig. 4 is a section taken on line 4 4 in Fig. 3 looking in the direction of the arrow $x$, said view illustrating a portion of the machine-frame and a side view of the brake. Fig. 5 is a horizontal cross-section of one of the side frames or housings of the machine-frame, said section being taken on line 5 5 in Fig. 2. Fig. 6 is a horizontal section taken on line 6 6 in Fig. 1, the gear and clutch device and connecting parts being omitted in this view. Fig. 7 is a detail vertical section taken on line 7 7 in Fig. 1, said view representing a portion of the machine-frame and the means for actuating the shaft upon which the frog-motion is placed. Fig 8 is a sectional representation of the shaft which is operated from the pinion-shaft, one of the eccentrics on said shaft, the adjustably-connected pitman, and the means of operative and pivotal connection between the lower end of the pitman and the slide or hammer. Figs. 9 and 10 are plan views of a pair of spiders or brackets and bearings employed with the raising and lowering mechanism represented in Figs. 1 and 6. Figs. 11 and 12 are face or side views of the frogmotion in its different positions in mesh with a gear of a shaft with which the adjustable pitmen are geared for shortening or lengthening the distances between the central axis of the said shaft on which the eccentrics are supported and the central axes of the means of pivotal connection between the lower ends or knuckles of the pitmen and the slide or hammer, and Fig 13 is a vertical section taken on line 13 13 in said Fig. 11. Fig. 14 is a face view, on an enlarged scale, of a portion of the die-holder of the machine and novel construction of holding-latches connected therewith. Fig. 15 is a vertical section of the several parts represented in said Fig. 14, said section being taken on line 15 15 in Fig. 14, looking in the direction of the arrow $y$ in said figure; and Fig. 16 is a perspective view of a portion of one of the dies to be supported or held in position by the parts represented in Figs. 14 and 15.

Similar numerals of reference are employed in all of the said above-described views to indicate corresponding parts.

In the said drawings, 1 indicates the complete machine or press, comprising a pair of end frames or housings 2 and 3, which are suitably tied together by means of a bed or supporting-table 4 and a top piece 5. The said end frames or housings 2 and 3, as will be seen from Figs. 2 and 5, are provided with guide portions formed by the members 6 of the said frames 2 and 3, in which are suitably fitted and slide therein the ends 8 of the slide or hammer 7. The said housings or frames 2 and 3 are also formed with suitably-disposed openings, through which the dies and finished work can be removed, if desired. As shown in Figs. 1 and 2, below the said slide or hammer 7 and suitably attached to the base of the machine is an anvil or support 9, which is preferably provided with a groove 10, in which is arranged and held the lower die 11, which may be of any desired cross-section, according to the work to be produced. The slide or hammer 7 can be made of any suitable design, being provided with depressions or recesses 12 at or near the lower edge of the hammer and in the opposite sides of the same, as shown in Figs. 1, 14, and 15, thereby providing the ribs 13, substantially as illustrated. Rotatably arranged in a hole 14, forming a bearing in each rib 13, is a pin or short spindle 15, having at one end a left-hand screw-thread 16, and at the other end said spindle or pin 15 has a right-hand screw-thread 17. The one end of the pin or spindle 15 has a squared end 18 for the placing thereon of a wrench for operating said pin or spindle. To hold the said spindles or pins 15 in their rotative positions in the bearings in said ribs against longitudinal displacement, an annular groove 19 is made in each pin or spindle 15, as shown, and secured upon the one side of each rib 13 is a plate 20, which is provided in its lower end with a slot 21, whereby the lower portion of the plate 20 can be fitted in the annular groove 19 in engagement against the edges or shoulders which bound the said groove. In this manner, as will be clearly evident, each pin or spindle 15 is held in its rotative position against any displacement in a longitudinal direction or laterally across the thickness of the ribs 13. The width of each groove 19 is preferably slightly larger than the thickness of its respective holding dog or plate 20, whereby a slight movement of the pin or spindle 15 laterally across the thickness of the rib 13 may take place for the purpose to be presently described. On opposite sides of each rib 13 are suitable posts 22, having perforated ends 23 and a connecting pin or bolt 24. Pivotally arranged on each pin or bolt 24, between each pair of posts 22 on a side of the ribs 13, is a latch or holding-dog 25, provided at the lower end with a jaw 26, having the inclined surface 26' on its inner portion, substantially as shown. At the upper end of each latch or dog 25 is a stud or finger 27, which is provided with a bearing in which is rotatively arranged the screw-pin 28 of a nut 29. The several nuts 29 are thus capable of an oscillatory motion, being held in place by means of nuts 30, which are secured upon the screw-pins 28. Before each latch or dog 25 is secured in place the nuts 29, above mentioned, which are provided with screw-threads that correspond to the right and left screw-threads of the respective ends of each pin or spindle 15, are screwed upon the said screw ends of the pin or spindle 15, as clearly illustrated in Fig. 15 of the drawings. Thus when the pins or spindles 15 are rotated by means of a wrench in either direction, as desired, the holding ends or jaws 26 of the latches or dogs 25 can be brought closer together or farther apart, according to the size and thickness of the upper die 31, which said latches are to hold in position. This upper die 31, which may be of any suitable cross-section, is usually arranged in a groove or slot 32 in the lower surface of the slide or hammer 7 and is securely locked in place by operating the pins or spindles 15 and forcing the holding-jaws 26 in firm gripping or biting engagement with oppositely-placed and inwardly-inclining depressions or recesses 33 in said upper die 3, whereby the inclined surface of each recess fits upon the inclined surface 26' of each latch and prevents the separation or pulling apart of these parts. It may sometimes happen that the recesses 33 in one of the sides of the die 31 have been cut deeper than the recesses in the opposite side of the die or one recess with constant use may have become worn down more than the oppositely-placed recess. In such case, that the jaws 26 of the latches 25 may just as firmly bite or grasp the opposite sides of the die 31 and hold it in position, it is necessary that the pin or spindle 15 shall be capable of a slight movement laterally across the thickness of the rib 13, whereby the various parts will accommodate themselves to the varying depths or other inequalities in the said recesses or depressions 33 and firmly hold the die 31 in its position against the lower face of the slide or hammer. The slide or hammer may also be provided with a hand-rail 34, if desired.

At the back of the press each end frame or housing 2 and 3 is provided with a bearing 35 for the main or pinion shaft 36 of the machine, upon which is secured at the one end near the frame 2 a pinion 37. The opposite end 38 of the said shaft 36 extends for some distance beyond the frame or housing 3, as represented in Fig. 1, said end rotating in a bearing 40 of a bracket 39, which is suitably secured upon the side of said frame or housing. Upon the said end of the shaft 36 is a loose pulley 41 of a friction-clutch. The driving-belt (not shown in the drawings) passes over this pulley, and 42 represents a sleeve which is movable endwise upon said end portion 38 of the shaft 36 and operates a pair of toggles or links 43 for operatively connecting the loose pulley 41 with the shaft 36 when it is desired to cause the rotation of said shaft. To actuate the sleeve 42, a treadle 44, which is secured upon a cross-rod 45, arranged in the bearings 46, is employed. Secured to the said cross-rod 45 is an upwardly-extending link 47, and pivotally connected with said lind 47 is a connecting-rod 48, arranged to oscillate on a bearing 49. Pivotally connected with the upper end of said rod 49 on a pin 50 is an arm 51, the said arm being pivoted upon said pin 50 in such a manner that two oppositely-extending members 52 and 53 are provided. Pivotally connected with the free end of the member 52 is the lower end of an upwardly-extending rod 54, said rod passing through a suitable opening in the flange 57 of the bracket 39 and being pivotally arranged on a pin of a lug or extension 55 on said bracket. A forked or yoke-shaped end piece 56 of said arm 55 is connected with the sleeve 42, and it will be clearly evident that when the operator depresses the treadle 44 these several links and rods will cause said sleeve 42 to slide toward the pulley 41 of the friction device, and thereby set the shaft 36 in operation. Upon said shaft 36 we have also arranged a friction disk or brake 57, and 58 is a brake-shoe provided with a post 59. This post is slidably arranged in a bearing 60, attached to the side of the frame or housing 3 of the press, as shown in Figs. 3 and 4. The bearing 60 is provided with a pair of downwardly-extending and perforated ears or lugs 61, between which is arranged on a pin 62 a cam-shaped end 64 of a link 63. This link 63 has a slotted end 65 and is operatively connected, by means of a pin or bolt 66, with the member 53 of the arm 51. Under normal conditions when the parts of the machine are at rest a stout spring 67, which is arranged between the foot-treadle 44 and a suitable fastening device, as 68′, at the side of the frame 3, causes the several parts to be in the positions indicated more especially in Fig. 3 of the drawings, with the brake-shoe 58 forced by the cam end 64 of the link 63 in firm binding or braking engagement with the surface of the brake-disk 56, thus retaining the slide or hammer in its raised position to enable the workman to safely place the dies in their proper positions in the machine. When the operator has depressed the treadle 44 and has thereby caused the operation of the shaft 36, as above described, the member 53 of the arm 51 has also moved in an upward direction, whereby the cam-shaped end 64 of the link 63 is removed sufficiently from the lower end of the post 59, and the brake-shoe 58, owing to its weight, drops away from holding engagement with the brake-disk 57, and thereby allows of the free rotation of the shaft 36. When the foot is removed from the treadle 44, then the spring 67 again causes these several parts to assume their initial positions, with the friction devices thrown out of engagement with the shaft 36 and the brake-shoe 58 again in its positive holding engagement with the said disk 57.

The means for causing a reciprocatory motion of the slide or hammer 7 is represented in Figs. 1, 2, and 8; and it consists, essentially, of a shaft 68, which rotates in suitable bearings 69 in the top piece 5. A hub 70 and collar 71 on said shaft 68 prevent lateral displacement, and 72 is a gear on said shaft which is driven from the pinion 37 on the main or pinion shaft 36. Upon this shaft 68 we have arranged a pair of eccentrics 73, and connected by means of a pitman 74, which is screwed into the threaded socket 75 of each eccentric, is the slide or hammer 7. Suitably held and fixed upon the central portion of each pitman is a bevel-gear 76 for the purposes to be presently described, and 77 and 78 are oppositely-arranged screw-threads on each pitman. The upper screw-thread 77 is screwed into the socket 75 of the eccentric and the lower screw-threaded portion 78 is screwed into a screw-socket 80 of a pitman-strap or knuckle 79. The lower portion of each strap or knuckle 79 is preferably curved, as shown, and is snugly fitted in a recessed part 81 in the upper edge of the slide or hammer 7, being pivotally connected therewith by means of pins 82, which are fixed in the perforated ears or lugs 83, substantially as illustrated. Owing to the arrangement of these eccentrics and the pitmen the slide or hammer is suspended from the shaft 68 and is caused to move up and down with the rotary movements of the said shaft and eccentrics thereon.

To remove all unnecessary strain from the shaft 68 and prevent it from being forced out of alinement when the dies are operated, the upper cross-piece 5 may have a pair of downwardly-extending members 84, the under surfaces of which are recessed and are fitted about the upper cylindrical portion of the shaft 68 and take up any upward force, whereby the bearings 69 are relieved and will last much longer than would otherwise be the case. In like manner the lower curved surface of each pitman-strap or knuckle 79 is snugly fitted in the correspondingly-curved depression 81 in the upper edge of the slide or hammer 7 and all undue strain is removed from the pins or bolts 82 when the machine is being operated.

In order to rapidly adjust the slide or hammer, a friction-pulley 84 is loosely arranged on the shaft 36, the said pulley being capable of being forced in operative engagement with the pulley 41 without operating the shaft 36 by a slide-collar 85. Operative engagement is caused between the cone-surfaces of the pulleys 41 and 85 by a hand-lever 86, which is secured to a rod 87, arranged in the bearings 88 at the side of the frame or housing 3. Secured to this rod 87 is a link 89, which is pivotally connected with the sleeve-operating arm 90, the latter being pivoted upon a pin 91 in the lugs or projections 92', substantially as shown in Fig. 3. Suitably secured against the back of the frame 3 is a bracket 92, which is provided with bearings 93, in which is a spindle 94. This spindle is driven from a belt which passes over the friction-disk 84 and a wheel 95 on said spindle. Upon the opposite end of said spindle 94 is a second wheel 96, over which passes a belt 97 for driving a wheel 98, which is secured upon a shaft 99, on which the previously-mentioned frog-motion or gearing for causing the reverse movements of the pitmen 77 is also arranged. As will be seen from Fig. 8, the bevel-gears 76, previously mentioned, are each provided with a flanged hub 100, and arranged on each flanged hub 100 of the respective gears are two spiders or brackets 101 and 102. (Represented in Figs. 1, 6, 9, and 10.)

Each spider comprises two members 103 and 104, which are secured together by means of bolts or screws 105 to provide the bearing 106, whereby each spider can be placed around the hub 100 of the respective bevel-gears 76. Thus each spider is retained in position, and to prevent any rotation of the spiders upon the hubs 100 of the bevel-gears when the latter are turning with their pitmen each member 103 of the two spiders has a rearwardly-extending part 107, to which are attached, by means of bolts 109 or in any well-known manner, the respective ends of a bar or rod 108. The members 104 of each spider are further provided with the forwardly-extending arms 110, having bearings 111, in which the shaft 99, which is provided with the pulley 98, is rotatably arranged. The two spiders or brackets are also provided with a bearing 112, in which rotates a shaft 113, provided at its respective ends with the bevel-pinions 114, which are respectively in mesh with the bevel-gears 76 of the two pitmen 74. To transfer the rotary motion of the shaft 99 in reverse directions to said shaft 113, said latter shaft has secured thereon a toothed wheel 115, with which can be brought in operative engagement either one of two toothed wheels or gears 116 and 117, the gear 117 being driven from a pinion 118, fixed on the shaft 99. The said gears 117 and 118 are at all times in mesh with each other, as will be seen from Figs. 11 and 12 of the drawings, and are arranged on pins or studs formed on a plate or frame-piece 119, which is provided with a handle 120. The said plate 119 is capable of oscillation upon the shaft 99, being manipulated by the handle 120, whereby either gear 116 or 117 can be made to mesh with the gear 115 and the shaft 113 made to revolve in its reverse directions, as clearly indicated by the arrows in the said Figs. 11 and 12. The spider 101 in this case is provided with a downwardly-extending plate or member 121, in which are three holes or perforations 122, 123, and 124, which are concentric with the central axis of the shaft 99. The said plate 121 is also provided with the two stops 125 and 126.

Pivotally secured upon the handle 120 is a spring-actuated lever 127, which has a stud or pin 128, that extends through a hole 129 in the handle, as illustrated in Fig. 13. This stud or pin 128 can be placed in either of the holes or perforations 122, 123, or 124 in the plate 121 by moving the handle in the proper direction, the said movement of the handle being limited by the stops 125 and 126. When the stud or finger 128 is in the hole 123, then the two pinions or gears 116 and 117 are both disengaged from the gear 115. When, however, it is desired to adjust the slide or hammer and raise it, then the stud 128 of the lever 127 is inserted in the hole 124 of the plate 121 by bringing the arm or handle 120 against the stop 126. Motion is thereby transmitted directly from the shaft 99, by means of the gear 117, to the wheel 115, whereby the shaft 113 will rotate in the direction of the arrows in Fig. 11. The two bevel-pinions 114 will then cause the bevel-gears 76 on the respective pitmen 74 to rotate said pitmen in such directions that the distance between the central axis of the shaft 68 and the axes of the pins 82 will be shortened and the slide or hammer can be raised the desired distance. When sufficiently raised, the stud 128 is again inserted in the hole 123, whereby the shaft 113 and parts actuated therefrom are thrown out of operation, and the hammer can be made to reciprocate for the purposes of bending the sheet metal between the dies by the application of pressure upon the foot-treadle 44.

Should the operator wish to lower the slide or hammer, he inserts the stud 128 into the hole 122 in the plate 121 by bringing the arm 120 against the stop 125 on said plate. This throws the gear 116 in mesh with the gear 115, and the motion from the shaft 99 is then transmitted first by means of the gear 117 to the gear 116 and then to the gear 115. The shaft 113 then revolves in the opposite direction, as indicated by the arrow in Fig. 12, whereby the bevel-pinions 114 cause the bevel-gears 76 and the pitmen 74 to turn in opposite directions from those above specified, the revolutions of the pitmen causing the distances between the central axis of the shaft 68 and the axes of the pins 82 to become greater, whereby the slide or hammer can be lowered the desired distance. When properly lowered, the stud or pin 128 is again inserted in the hole 123 and the gears are thrown out of action. By means of this frog-motion or gear mechanism it will be clearly seen that the point of application of the stroke of the slide or hammer can be suitably varied and may be lengthened or shortened according to the work to be finished in the machine.

As illustrated in Figs. 1 and 7, a strap 132 may be loosely arranged upon the shaft 68, said strap having an arm 135 and a weight 136 thereon. A bearing 130 is also provided at the lower end of the arm 135, in which there is a pin or bolt 131 for a roller 132', which rests upon the belt 97 and acts as a belt-tightener to prevent the slipping of said belt over the pulleys 96 and 98 when the lever 86 has been operated to throw in the friction-wheel 84. The said shaft 99 may also have secured thereon a hand-wheel 133 for manually operating the said shaft and by means of the various mechanism raising or lowering the slide or hammer, if desired, which is of advantage in that the workman can thereby raise the hammer when he desires to inspect the work without first setting in motion the various mechanism by means of the hand-lever hereinabove mentioned. Lock-nuts 134 may be arranged on the pitmen 74 for securing the several parts in their proper places on said pitmen.

From the above description of this invention it will be seen that the arrangement of the various mechanism is very simple and is such that the slide or hammer is effectually operated, at the same time being under the perfect control of the operator at all times and can be started or stopped at any part of the stroke. Furthermore, the adjustment of the slide or hammer is very rapidly accomplished by means of the frog-motion, actuated by the friction-pulley and hand-lever, whereby the pitmen are simultaneously adjusted, or rather shortened or lengthened, as desired, and the alinement of the parts is kept perfect. The construction of the holding means for holding the upper die in position is simple and perfect, and the dies are removable from either the front or back of the press, or through the opening in the housing or side frames, which is of great advantage in cases where the finished work has to be slipped from the end of the die before being able to remove the die.

Of course it will be clearly understood that various changes may be made in the several arrangements and combinations of the various mechanism and in the details of the construction of the same without departing from the scope of this invention. Hence we do not limit our invention to the exact arrangements and combinations of the various mechanism and the devices herein set forth, nor do we confine ourselves to the details of the construction of the same.

Having thus described our invention, what we claim is—

1. In a power-press, the combination, with the main driving-shaft, the slide or hammer supporting shaft, and the slide or hammer, of a pair of eccentrics on said slide or hammer supporting shaft, a means of pivotal connection on said slide or hammer, consisting, of curved recessed parts 81 in the upper edge of the hammer, and perforated lugs 83 adjacent to the said perforated parts 81, provided with pins 82, and a pitman between each eccentric and said means of pivotal connection, provided with right and left screw-threads, a knuckle on the lower screw portion of each pitman, each knuckle being pivotally secured on a pin 82 and having a curved part snugly fitted into the curved recessed parts 81 between said lugs 83, and means for causing the rotation of said pitmen for adjustment of the slide or hammer, substantially as and for the purposes set forth.

2. In a power-press, the combination, with the main driving-shaft, the slide or hammer supporting shaft, and the slide or hammer, of eccentrics on said slide or hammer supporting shaft, a means of pivotal connection on said slide or hammer, a pitman between each eccentric and said means of pivotal connection, provided with right and left screw-threads, and means for causing the rotation of said pitmen for adjustment of the slide or hammer, comprising, a bevel-gear fixed on each pitman, a spider-frame provided with bearings on the hub of each bevel-gear, a shaft 113 rotatably arranged in said bearings, bevel-pinions at the ends of said shaft in mesh with said bevel-gears, a toothed wheel on said shaft, and a "frog-motion" adapted to be brought in engagement with said toothed wheel for producing the reverse rotations of said shaft and the said pitmen, substantially as and for the purposes set forth.

3. In a power-press, the combination, with the main driving-shaft, the slide or hammer supporting shaft, and the slide or hammer, of eccentrics on said slide or hammer supporting shaft, a means of pivotal connection on said slide or hammer, a pitman between each eccentric and said means of pivotal connection, provided with right and left screw-threads, means for causing the rotation of said pitmen for adjustment of the slide or hammer, comprising, a bevel-gear fixed on each pitman, a spider-frame provided with bearings on the hub of each bevel-gear, a shaft 113 rotatably arranged in said bearings, bevel-pinions at the ends of said shaft in mesh with said bevel-gears, a toothed wheel on said shaft, a shaft 99 also rotatably arranged in bearings of said spider-frames, a "frog-motion" on said shaft 99, means for operating said motion for its engagement with the toothed wheel on said shaft 113, to produce the reverse rotations of said shaft 113 and of said pitmen, and means for operating said shaft 99, substantially as and for the purposes set forth.

4. In a power-press, the combination, with the main driving-shaft, the slide or hammer supporting shaft, and the slide or hammer, of eccentrics on said slide or hammer supporting shaft, a means of pivotal connection on said slide or hammer, a pitman between each eccentric and said means of pivotal connection, provided with right and left screw-threads, means for causing the rotation of said pitmen for adjustment of the slide or hammer, comprising a bevel-gear fixed on each pitman, a spider-frame provided with bearings on the hub of each bevel-gear, a shaft 113 rotatably arranged in said bearings, bevel-pinions at the ends of said shaft in mesh with said bevel-gears, a toothed wheel on said shaft, a shaft 99 also rotatably arranged in bearings of said spider-frames, a "frog-motion" on said shaft 99, means for operating said motion for its engagement with the toothed wheel on said shaft 113, to produce the reverse rotations of said shaft 113 and said pitmen and means for operating said shaft 99, consisting, essentially, of a friction-clutch on the main driving-shaft, means for actuating said friction-clutch, and a driving means between said friction-clutch and the shaft 99, substantially as and for the purposes set forth.

5. In a power-press, the combination, with the main driving-shaft, the slide or hammer supporting shaft, and the slide or hammer, of eccentrics on said slide or hammer supporting shaft, a means of pivotal connection on said slide or hammer, a pitman between each eccentric and said means of pivotal connection, provided with right and left screw-threads, means for causing the rotation of said pitmen for adjustment of the slide or hammer, comprising a bevel-gear fixed on each pitman, a spider-frame provided with bearings on the hub of each bevel-gear, a shaft 113 rotatably arranged in said bearings, bevel-pinions at the ends of said shaft in mesh with said bevel-gears, a toothed wheel on said shaft, a shaft 99 also rotatably arranged in bearings on said spider-frames, a "frog-motion" on said shaft 99, means for operating said motion for its engagement with the toothed wheel on said shaft 113, to produce the reverse rotations of said shaft 113 and said pitmen, and means for operating said shaft 99, consisting, essentially, of a friction-clutch comprising a pulley 84 and a slide-collar 85 both on the main driving-shaft, a hand-lever 86, and operating-links between said lever and the slide-collar for actuating the said collar, a shaft 94, a pulley 95 thereon, and a belt arranged over said pulleys 84 and 95, a second pulley 96 on said shaft 94, a pulley 98 on said shaft 99, and a belt passing over said pulleys 96 and 98, substantially as and for the purposes set forth.

6. In a power-press, the combination, with the slide or hammer supporting shaft and a slide or hammer, curved recessed parts 81 in the upper edge of said hammer, and perforated lugs adjacent to said parts 81, provided with pins 82, of a means of suspension between said shaft and said curved recessed parts 81 and said lugs 82 on the slide or hammer, consisting, essentially, of a pitman having right and left screw-threads, and a knuckle on one of said screw-threads, said knuckle having a curved part snugly fitted in one of said curved recessed parts 81 and being secured on one of said pins 82, a bevel-gear 76 on said pitman, a bevel-pinion 114 in mesh with said gear 76, and means for causing the reverse rotations of said bevel-pinion 114, substantially as and for the purposes set forth.

7. In a power-press, the combination, with the slide or hammer supporting shaft and a slide or hammer, of a means of suspension between said shaft and said slide or hammer, consisting, essentially, of a pitman having right and left screw-threads, a bevel-gear 76 thereon, a bevel-pinion 114 in mesh with said gear 76, and means for causing the reverse rotations of said bevel-pinion 114, consisting, essentially, of a shaft 113, a gear 115 on said shaft, and a "frog-motion" in mesh with said gear 115, substantially as and for the purposes set forth.

8. In a power-press, the combination, with the slide or hammer supporting shaft and a slide or hammer, of a means of suspension between said shaft and said slide or hammer, consisting, essentially, of a pair of pitmen having right and left screw-threads, bevel-gears 76 on said pitmen, each gear having a flanged hub, a spider 101 on one hub of one gear, and a spider 102 on the hub of the other gear, means between said spiders to prevent their turning with said gears, said spiders having bearings, a shaft 113 in some of said bearings, a bevel-pinion 114 at each end of said shaft 113, a gear 115, a shaft 99 in other bearings of said spiders, a member 121 on said spider 101, provided with holes or perforations, a plate 119 on said shaft 99, means connected with said plate 119 adapted to be brought in engagement with the holes or perforations in said member 121, and gears 116, 117 and 118 on said plate 119, all arranged substantially as and for the purposes set forth.

9. In a power-press, the combination, with the main driving-shaft, the slide or hammer, and means for causing reciprocatory movements of said slide or hammer, of means for actuating said main driving-shaft, consisting, of a friction device and its clutch, a slide-collar 42 on said shaft, and means for actuating said slide-collar, consisting, essentially, of a foot-treadle, a cross-rod 45, a link 47, a connecting-rod 48, an arm 51, and an arm 55 having a yoke-shaped end in engagement with said slide-collar, substantially as and for the purposes set forth.

10. In a power-press, the combination, with the main driving-shaft, the slide or hammer, and means for causing reciprocatory movements of said slide or hammer, of means for actuating said main driving-shaft, consisting, of a friction device and its clutch, a slide-collar 42 on said shaft, and means for actuating said slide-collar, consisting, essentially, of a foot-treadle, a cross-rod 45, a link 47, a connecting-rod 48, an arm 51, and an arm 55 having a yoke-shaped end in engagement with said slide-collar, and a friction-brake on said shaft, and means for releasing said friction-brake simultaneously with the actuation of said friction-clutch, consisting, of a member 53 of said arm 51, a brake-shoe, and a cam-shaped link 63 arranged between said brake-shoe and the free end of said member 53, substantially as and for the purposes set forth.

11. In a power-press, the combination, with the side frames or housings, and a top piece 5, of bearings on said top piece, a slide or hammer supporting shaft in said bearings, and a downwardly-extending member 84 on said top piece adapted to embrace a portion of said shaft, substantially as and for the purposes set forth.

12. In a power-press, the combination, with the slide or hammer supporting shaft and the slide or hammer, of a means of suspension for the slide or hammer from said shaft, consisting, of a pair of pitmen, means for connecting said pitmen to said shaft, and means for pivotally connecting the lower ends of the pitmen to said slide or hammer, comprising, the pitman-straps 79 having their lower curved portions fitted in correspondingly-shaped recesses 81 in the upper edge of the slide or hammer, perforated lugs on said slide or hammer, and pins in said lugs upon which said straps 79 are pivotally arranged, substantially as and for the purposes set forth.

13. In a power-press, the combination, with a reciprocating slide or hammer, provided with ribs, and depressions on opposite sides of said ribs, a post on each side of said ribs, a latch pivotally arranged on each post, and means at the upper ends of said latches above the points of support of said latches, arranged to spread said upper ends and causing the lower ends to grasp the opposite sides of a die, and immovably lock said lower ends in their grasping positions on opposite sides of the die, substantially as and for the purposes set forth.

14. In a power-press, the combination, with a reciprocating slide or hammer, provided with ribs, and depressions on opposite sides of said ribs, a post on each side of said ribs, a latch pivotally arranged on each post, and means at the upper ends of said latches for causing them to grasp the opposite sides of a die, consisting, of a pin or spindle rotatively arranged in a bearing in each rib, having right and left screw-threads, and nuts on said threads pivotally connected with the upper end of each latch, substantially as and for the purposes set forth.

15. In a power-press, the combination, with a reciprocating slide or hammer, provided with ribs, and depressions on opposite sides of said ribs, a post on each side of said ribs, a latch pivotally arranged on each post, and means at the upper ends of said latches for causing them to grasp the opposite sides of a die, consisting, of a pin or spindle rotatively arranged in a bearing in each rib, having right and left screw-threads, an upwardly-extending finger on each latch, provided with a bearing, a screw-pin in said bearing, and a nut 30 on each screw-pin, and a nut 29 on each screw-pin screwed upon the threaded portions of said pin or spindle, substantially as and for the purposes set forth.

16. In a power-press, the combination, with a reciprocating slide or hammer, provided with ribs, and depressions on opposite sides of said ribs, a post on each side of said ribs, a latch pivotally arranged on each post, and means at the upper ends of said latches for causing them to grasp the opposite sides of a die, consisting, of a pin or spindle rotatively arranged in a bearing in each rib, having right and left screw-threads, an upwardly-extending finger on each latch, provided with a bearing, a screw-pin in said bearing, a nut 30 on said screw-pin, and a nut 29 on said screw-pin screwed upon the threaded portions of said pin or spindle, and means connected with each pin or spindle for preventing the longitudinal displacement of said pins or spindles, consisting, of slotted plates 20 fitted over grooved portions in said pins or spindles, substantially as and for the purposes set forth.

17. In a power-press, the combination, with a reciprocating slide or hammer, of a pair of oppositely-placed holding-latches arranged in depressions on opposite sides of a rib in said slide or hammer, a pin or spindle rotatively arranged in a bearing in said rib, for operating said latches, said pin having a limited movement longitudinally in said bearing, and means for limiting said movement in a longitudinal direction, substantially as and for the purposes set forth.

18. In a power-press, the combination, with a reciprocating slide or hammer, of a pair of oppositely-placed holding-latches arranged in depressions on opposite sides of a rib in said slide or hammer, a pin or spindle rotatively arranged in a bearing in said rib, for operating said latches, said pin having a limited movement longitudinally in said bearing, and means for limiting said longitudinal movement of said pin or spindle, consisting, of an annular groove in said pin or spindle, and a plate 20 secured to said rib having a slotted portion arranged in said groove and over said pin or spindle, substantially as and for the purposes set forth.

19. In a power-press, the combination, with a reciprocating slide or hammer provided with a perforated rib, of a holding-latch, a spindle rotatively arranged in the perforation in said rib for operating said latch, said pin also having a limited sliding movement longitudinally in said perforation, substantially as and for the purposes set forth.

20. In a power-press, the combination, with a reciprocating slide or hammer, of a holding-latch, a rotatively-arranged pin or spindle for operating said latch, said pin being arranged in a bearing in said slide or hammer, and having a limited movement longitudinally in said bearing, and means for limiting said movement in a longitudinal direction, substantially as and for the purposes set forth.

21. In a power-press, the combination, with the bed of the press, the slide or hammer, and dies, of a housing having openings therein, through which the die or the work thereon can be removed, substantially as and for the purposes set forth.

In testimony that we claim the invention set forth above we have hereunto set our hands this 28th day of February, 1901.

GEORGE A. OHL, SR.
GEORGE A. OHL, JR.
FREDERICK W. THEBERATH.
AUGUST A. BERGHOF.

Witnesses:
FREDK. C. FRAENTZEL,
JOHN S. LA BAR.